(12) United States Patent
Walker et al.

(10) Patent No.: US 7,543,020 B2
(45) Date of Patent: Jun. 2, 2009

(54) DISTRIBUTED CLIENT SERVICES BASED ON EXECUTION OF SERVICE ATTRIBUTES AND DATA ATTRIBUTES BY MULTIPLE NODES IN RESOURCE GROUPS

(75) Inventors: Douglas Jay Walker, Raleigh, NC (US); Bryan C. Turner, Apex, NC (US); John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1017 days.

(21) Appl. No.: 11/060,387

(22) Filed: Feb. 17, 2005

(65) Prior Publication Data

US 2006/0179143 A1     Aug. 10, 2006

Related U.S. Application Data

(63) Continuation-in-part of application No. 11/053,954, filed on Feb. 10, 2005.

(51) Int. Cl.
*G06F 15/16* (2006.01)
*G06F 12/00* (2006.01)

(52) U.S. Cl. ....................... 709/203; 719/105
(58) Field of Classification Search ......... 709/203–205, 709/217, 218, 250; 719/105
See application file for complete search history.

(56) References Cited

U.S. PATENT DOCUMENTS

| | | | |
|---|---|---|---|
| 5,428,793 | A | 6/1995 | Odnert et al. |
| 5,555,417 | A | 9/1996 | Odnert et al. |
| 5,951,694 | A * | 9/1999 | Choquier et al. ............. 714/15 |
| 6,421,687 | B1 * | 7/2002 | Klostermann ............... 707/202 |
| 6,697,064 | B1 | 2/2004 | Kilgard et al. |
| 7,299,410 | B2 * | 11/2007 | Kays et al. ................... 715/234 |
| 7,457,835 | B2 * | 11/2008 | Toebes et al. ............... 707/204 |
| 2004/0204949 | A1 * | 10/2004 | Shaji et al. ..................... 705/1 |
| 2004/0215650 | A1 * | 10/2004 | Shaji et al. .................. 707/102 |

OTHER PUBLICATIONS

Karger et al., "Finding Nearest Neighbors in Growth-restricted Metrics", ACM Symposium on Theory of Computing (STOC '92), Montreal, May 2002.
Anderson et al., "Global namespace for files", *IBM Systems Journal*, 2004, pp. 702-722, vol. 48, No. 4, IBM.

(Continued)

*Primary Examiner*—Zarni Maung
(74) *Attorney, Agent, or Firm*—Leon R. Turkevich

(57) ABSTRACT

A network provides distributed client services based on participation in respective resource groups by computing nodes, each resource group including a corresponding resource requirement for any computing node that joins the corresponding resource group for execution of the corresponding distributed client service. Each computing node, in response to determining its corresponding available node capacity, is configured for selectively creating and joining at least one new resource group for execution of a corresponding distributed client service having a corresponding resource requirement, and/or selectively joining at least one of the available resource groups, based on the corresponding available node capacity satisfying the corresponding resource requirement. Each distributed client service also includes service attributes that define parameters for execution of the distributed client service, and data attributes that define the attributes required for data to be used in the distributed client service.

30 Claims, 5 Drawing Sheets

OTHER PUBLICATIONS

Bourbonnais et al, "Towards an information infrastructure for the grid", *IBM Systems Journal*, 2004, pp. 665-688, vol. 43, No. 4, IBM.

Carpenter et al., "Abstract interdomain security assertions: A basis for extra-grid virtual organizations", *IBM Systems Journal*, 2004, pp. 689-701, vol. 43, No. 4, IBM.

Dabek et al., "Wide-area cooperative storage with CFS", *SOPS '01*, Oct. 21-24, 2001, Banff, Canada.

Cates, "Robust and Efficient Data Management for a Distributed Hash Table", Master's thesis, Mass. Institute of Technology, May 2003.

Burkard, "Herodotus: A Peer-to-Peer Web Archival System", Master's Thesis, Massachusetts Institute of Technology, Jun. 2002.

Stoica et al., "Chord: A Scalable Peer-to-peer Lookup Protocol for Internet Applications", *SIGCOMM '01*, Aug. 27-31, 2001, San Diego, CA, ACM.

Dabek, "A Cooperative File System", Master's Thesis, Massachusetts Institute of Technology, Sep. 2001.

Cox et al., "Serving DNS using a Peer-to-Peer Lookup Service", In the proceedings of te First International Workshop on Peer-to-Peer Systems (IPTPS '02), Mar. 2002, Cambridge, MA, pp. 1-7.

Butte (Grid IT Architect), "Solving the data warehouse dilemma with grid technology", *IBM Global Services*, Aug. 2004, IBM.

Horn et al., "A Logger System based on Web services", *IBM Systems Journal*, 2004, pp. 723-733, vol. 43, No. 4, IBM.

Dabek et al., "Building Peer-to-Peer Systems With Chord, a Distributed Lookup Service", Proceedings of the 8th Workshop on Hot Topics in Operating Systems (HotOS-VIII), May 2001.

Liben-Nowell et al., "Observations on the Dynamic Evolution of Peer-to-Peer Networks", In the proceedings of the First International Workshop on Peer-to-Peer Systems (IPTPS '02), Mar. 2002, Cambridge, MA.

Joseph et al., "Evolution of grid computing architecture and grid adoption models", *IBM Systems Journal*, 2004, pp. 624-645, vol. 43, No. 4, IBM.

Lewis et al., "MyMED: A database system for biomedical research on MEDLINE data", *IBM Systems Journal*, 2004, pp. 756-767, vol. 43, No. 4, IBM.

Meliksetian et al., "Design and implementation of an enterprise grid", *IBM Systems Journal*, 2004, pp. 646-664, vol. 43, No. 4, IBM.

Stoica et al., "Chord: A Scalable Peer-to-peer Lookup Service for Internet Applications", ACM SIGCOMM 2001, San Diego, Aug. 2001, pp. 149-160.

Petersen et al., "A Blueprint for Introducing Disruptive Technology into the Internet", Proceedings of the First ACM Workshop on Hot Topics in Networks (HotNets-1),Princeton, NJ, Oct. 2002.

Liben-Nowell et al., "Analysis of the Evolution of Peer-to-Peer Systems", ACM Conf. On Principles of Distributed Computing (PODC), Monterey, CA, Jul. 2002.

"Preface", *IBM Systems Journal*, 2004, pp. 622-623, vol. 43, No. 4, IBM.

SIT et al., "Security Considerations for Peer-to-Peer Distributed Hash Tables", In the proceedings of the First International Workshop on Peer-to-Peer Systems (IPTPS '02), Mar. 2002, Cambridge, MA.

Tan et al., "Service domains", *IBM Systems Journal*, 2004, pp. 734-755, vol. 43, No. 4, IBM.

"The BitTorrent Effect", printed Jan. 26, 2005 (8 pages), available at http://www.wired.com/archive/13.01/bittorrent_pr.html.

"Grid Computing", *Wikipedia*, printed Jan. 26, 2005 (3 pages), available at http://en.wikipedia.org/wiki/Grid-computing.

Mockapetris, "Domain Names—Concepts and Facilities", Network Working Group, Request for Comments: 1034, Nov. 1987.

Mockapetris, "Domain Names—Implementation and Specification", Network Working Group, Request for Comments: 1035, Nov. 1987.

Gulbrandsen et al., "A DNS RR for specifying the location of services (DNS SRV)", Network Working Group, Request for Comments: 2782, Feb. 2000.

Calhoun et al., "Diameter Base Protocol", Network Working Group, Request for Comments: 3588, Sep. 2003.

Yokota et al., "A Proposal of DNS-Based Adaptive Load Balancing Method for Mirror Server Systems and Its Implementation", 18th International Conference on Advanced Information Networking and Applications (AINA '04) vol. 2, Mar. 29-31, 2004, pp. 1-6, Fukuoka, Japan.

"Dynamic Domain Name Service", DyDNS, <http://www.dyns.com/services/services.htm>, Nov. 2, 2004 (5 pages).

"Linksys and Tzolkin Corporation Team-Up to Bundle TZO Dynamic DNS Service with Linksys'Top-Selling Cable/DSL Routers", Linksys, http://www.linksys.com/press/press.asp?prid=31>, Nov. 2, 2004 (2 pages).

U.S. Appl. No. 11/000,041, filed Dec. 1, 2004, Toebes et al.
U.S. Appl. No. 11/859,209, filed Jun. 3, 2004, Turner et al.
U.S. Appl. No. 11/859,208, filed Jun. 3, 2004, Turner et al.
U.S. Appl. No. 11/051,333, filed Feb. 7, 2005, Turner et al.

\* cited by examiner

Resource Group Attributes, 22

Dist. Computing Service Attributes, 24

26 — Service Attributes (OS Type, Apps., DLLs, etc.)
28 — Data Attributes (Type, Author, Date, Time, Class, etc.)

Resource Requirements for Joining, 20

| Min. CPU Power (5M Inst./sec) | Min Data Storage (20GB) | |
|---|---|---|
| Min. Bandwidth (100Mbps) | Min. Transaction Capacity (A) | ... |

Figure 2A

Resource Table, 30

| Computing Node (N1) Resources | | | | |
|---|---|---|---|---|
| Reserved | Storge Space | Bandwidth | Transaction Cap. | CPU Pwr. |
| System | 10GB | 50Mbps | AA | 5MInst/s |
| S1 | 30GB | 100Mbps | A | 5MInst/s |
| S2 | 30GB | 150Mbps | B | 10MInst/s |
| Available | 100GB | 700Mbps | C | 30MInst/s |

Figure 2B

DISTRIBUTED CLIENT SERVICES BASED ON EXECUTION OF SERVICE ATTRIBUTES AND DATA ATTRIBUTES BY MULTIPLE NODES IN RESOURCE GROUPS

This application is a continuation-in-part of commonly-assigned, copending application Ser. No. 11/053,954, filed Feb. 10, 2005, entitled "DISTRIBUTED COMPUTING BASED ON MULTIPLE NODES WITH DETERMINED CAPACITY SELECTIVELY JOINING RESOURCE GROUPS HAVING RESOURCE REQUIREMENTS", the disclosure of which is incorporated in its entirety herein by reference.

BACKGROUND OF THE INVENTION

1. Field of the Invention

The present invention relates to distributed computing in a network having multiple computing nodes. More particularly, the present invention relates to providing service virtualization of client-server type computing services using a peer-to-peer architecture that relies on multiple computing nodes for sharing tasks associated with providing the client-server type computing services in a distributed environment.

2. Description of the Related Art

Distributed computing has evolved to technologies that enable multiple devices to share in providing a given service. One well-known example involves BitTorrent, where a single source file within a group of BitTorrent users, called a swarm, spreads portions of a large data file (e.g., a digital movie, etc.) such that all members of the swarm have a portion of the large data file (a "chunk") to share. After the initial downloading of the portions to user computers, the portions of the data file are then uploaded to other users in the swarm that need the chunks. The BitTorrent rules require every user of the swarm that performs downloading to also do perform uploading. Hence, as more users attempt to download, the uploading capacity increases. Once all members of the swarm have shared all their chunks, all the members have their own complete source.

Hence, Bit-Torrent presumes that multiple copies of data are present on a peer-to-peer network; hence, it is presumed that the data will persist beyond the existence of the source that added the data to the network. Further, Bit-Torrent assumes that clients are unreliable and may disappear from the network, for example if a client device logs off the network. Consequently, Bit-Torrent relies on multiple copies of data on the network, where peers replicate the data to provide a larger distribution of the data.

Although BitTorrent has been demonstrated to be highly effective in applications such as file sharing, BitTorrent is modeled as a peer-to-peer application. Unlike client-server based applications such as web hosting, e-mail, etc., peer-to-peer applications are designed such that a peer client is configured for communicating with a destination peer client, and is not configured for obtaining any knowledge relating to network topology; hence, a peer client may be unaware that it is communicating with a cluster of servers. In addition, all peer devices must be online in order for any peer-to-peer services (e.g., instant messaging) to be operable. Hence, unlike client-server computing that relies on servers to provide persistent application state to enable management client transactions generated from client devices that have a limited network presence, there is no persistent state of client transactions in the network in peer-to-peer computing.

Hence, a fundamental problem between peer-to-peer computing and client-server computing involves reconciling the mutually incompatible features in a manner that would permit applying the advantages of peer-to-peer networking to client/server-based applications.

One technique utilized by UNIX programmers involves implementing server software on the same machine as a device executing client applications, referred to herein as a client device or user node. Unfortunately, attempts to implement servers on client devices are not practical, because the design of server protocols are inherently scarce resource protocols, and are not designed to scale with an exponential increase in the number of clients. For example, servers (e.g., Microsoft Exchange Servers) typically require persistent connections (e.g., TCP connections) between each other in order to synchronize data, where each additional server requires added connections between the new server and the existing servers, plus return connections, where the number of connections (N) between servers (S) is $N=S*(S-1)$. Hence, a linear growth in the number of servers results in an exponential growth in the number of connections between the servers. Consequently, many enterprise-class applications utilize server-based protocols that require synchronization among multiple servers.

As described above, peer-to-peer applications are not configured for obtaining any knowledge relating to network topology, and cannot provide a persistent state of client transactions. Hence, client-server-based applications cannot readily be modified for deployment execution on a peer-to-peer type architecture. Further, if the client device is not present (i.e., logged onto the application service) the participation of that client device in the application service is nonexistent. In addition, existing messaging servers (e.g., AOL instant messenger) are utilized solely to provide directory services in identifying users, and do not participate in providing services related to the actual application (e.g., data transfer) between client devices.

Hence, a fundamental problem in the conventional technologies is that enterprise-level applications, and consumer-level applications are designed according to a client-server architecture model. As described above, the client-server architecture model inherently cannot be implemented in a scalable manner as distributed servers manner due to the exponential nature of synchronization.

SUMMARY OF THE INVENTION

There is a need for an arrangement that enables client-server based applications (e.g., e-mail applications, web server applications, etc.), to be implemented in a scalable manner according to a distributed computing architecture that enables replication of data and services between client devices, eliminating the necessity of centralized servers.

There also is a need for an arrangement that enables existing applications that are designed according to a client-server architecture model to be deployed in a distributed network that enables peer-to-peer functionality and client-server functionality to exist in the same network in a scalable manner. In particular, there is a need for an arrangement that enables applications to be implemented using the scalable attributes of peer-to-peer networks, while also utilizing the client-server attributes that are optimum for enterprise-scale network applications.

There also is a need for an arrangement that enables an infrastructure to support a traditional client-server service, such that the server application that typically has provided the service can be distributed among one or more computers utilizing a peer-to-peer level protocol, the server application also being able to be executed on the same device typically used for executing the client application.

There also is a need for an arrangement that enables each of the computing nodes in a distributed network to adaptively participate in as many distributed services as desirable, based on the capacity of the corresponding computing node, enabling user nodes to participate in providing distributed services.

These and other needs are attained by the present invention, where a network provides distributed client services based on participation in respective resource groups by computing nodes, each resource group including a corresponding resource requirement for any computing node that joins the corresponding resource group for execution of the corresponding distributed client service. Each computing node, in response to determining its corresponding available node capacity, is configured for selectively creating and joining at least one new resource group for execution of a corresponding distributed client service having a corresponding resource requirement, and/or selectively joining at least one of the available resource groups, based on the corresponding available node capacity satisfying the corresponding resource requirement. Each distributed client service also includes service attributes that define parameters for execution of the distributed client service, and data attributes that define the attributes required for data to be used in the distributed client service. Hence, distributed client services can provided by multiple computing nodes, including user nodes, enabling client services to be provided using a distributed peer-to-peer architecture.

One aspect of the present invention provides a method in a computing node. The method includes determining an available node capacity for the computing node relative to any resource groups having been joined by the computing node, each resource group having a corresponding resource group attribute specifying a resource requirement for providing a corresponding distributed client service within a network, a service attribute that defines parameters for execution of the corresponding distributed client service, and a data attribute that defines service data to be used in providing the corresponding distributed client service for a client. The method also includes selectively joining at least one of the resource groups based on the corresponding resource requirement being less than the available node capacity. The method also includes executing the distributed client service for the corresponding at least one resource group having been joined by the computing node, according to the corresponding resource group attribute, including replicating the corresponding service data among any other computing nodes belonging to the at least one resource group according to the corresponding service attribute and the corresponding data attribute. The selective joining of a resource group enables each computing node to decide whether it prefers to join as many resource groups as desired, based on the available node capacity. In addition, the service attribute ensures that execution of the distributed client service is consistent among all computing nodes belonging to the resource group, while the data attribute ensures that the appropriate service data is replicated among the computing nodes of the resource group, enabling clients to access the identical client service and data from any one of the computing nodes, including where the client resides on one of the computing nodes.

Another aspect of the present invention provides a method in a network. The method includes providing resource groups, each resource group having a corresponding resource group attribute specifying a resource requirement for providing a corresponding distributed client service within the network, a service attribute that defines parameters for execution of the corresponding distributed client service, and a data attribute that defines service data to be used in providing the corresponding distributed client service for a client. Each computing node of the network (1) determines a corresponding available node capacity relative to any of said resource groups having been joined by the computing node, (2) selectively joins at least one of the resource groups based on the corresponding resource requirement being less than the available node capacity, and (3) executes the distributed client service for the corresponding at least one resource group having been joined by the computing node, according to the corresponding resource group attribute. The method also includes connecting a client, of the distributed client service, to the distributed client service via one of the computing nodes having joined the corresponding resource group. Further, each of the computing nodes having joined said at least one resource group perform the executing of the distributed client service based on replicating the corresponding service data among each of the other computing nodes belonging to the corresponding at least one resource group, according to the corresponding service attribute and the corresponding data attribute.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 2A and 2B are diagrams illustrating resource group attributes and node attributes that specify reserved resources and available node capacity, respectively.

BEST MODE FOR CARRYING OUT THE INVENTION

Figure 1:
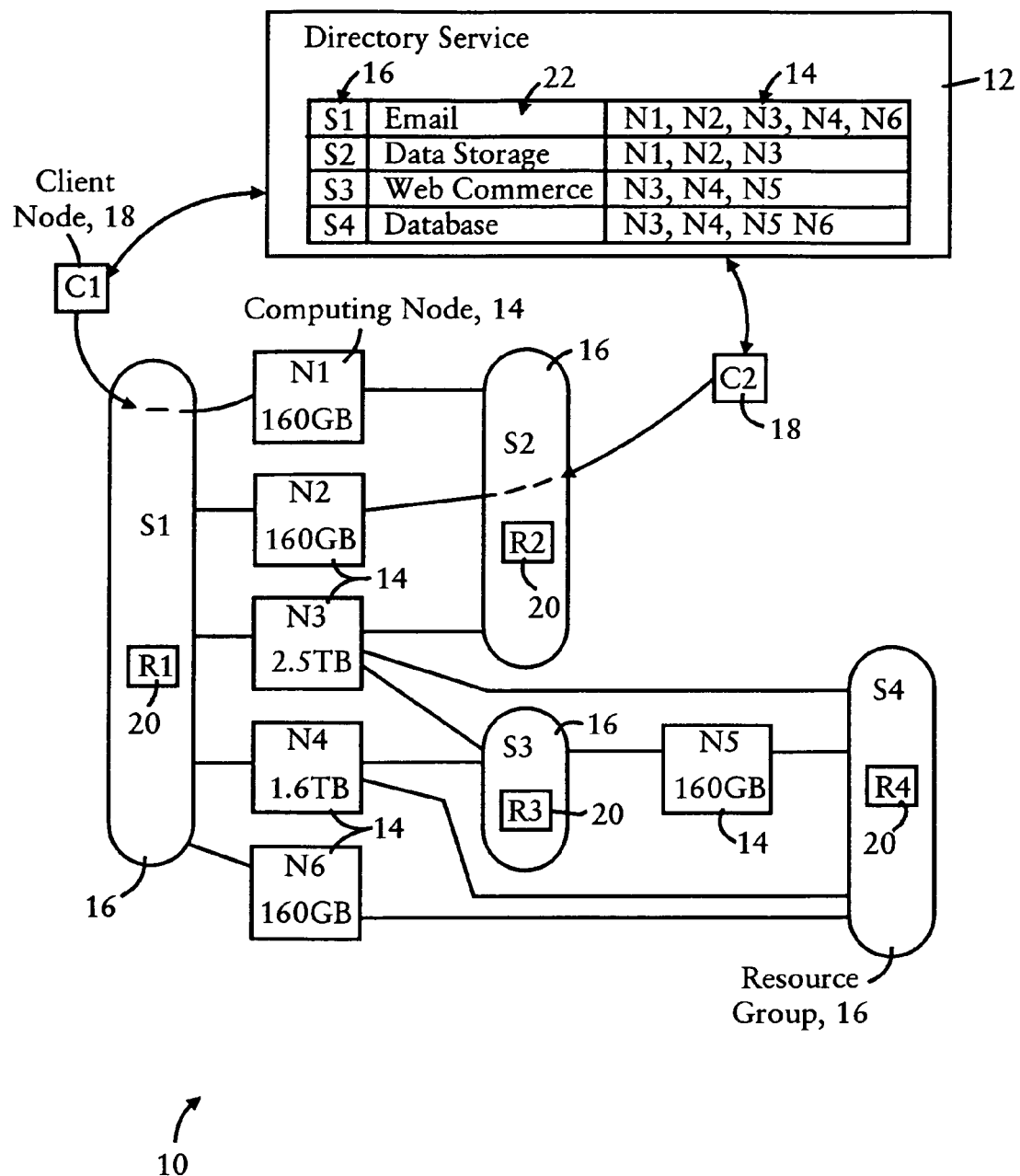
FIG. 1 is a diagram illustrating a distributed network having multiple computing nodes configured for providing distributed client services based on having joined multiple resource groups, according to an embodiment of the present invention.

The disclosed embodiment is directed to multiple computing nodes that are configured for joining a resource group in order to provide distributed client services. The ability to provide distributed client services is implemented based on numerous advantageous features, described in detail below, that address various aspects of distributed computing such as data replication, arbitration of data access and control, organizing computing nodes to provide distributed client services, identification of the computing nodes providing the desired distributed client services, plus identification and management of the replicated data objects into a distributed file system. These features will be described below, followed by a description of utilizing these features in order to provide distributed client services in a network. First, however, a brief overview of distributed services according to the disclosed embodiment will be provided.

Overview of Distributed Client Services

The disclosed embodiment is directed to implementing client-server based applications that are implemented using a peer-to-peer based topology, enabling the client-server based applications to be implemented in a network as distributed client services. Hence, service data associated with a given client service is distributed throughout the network, ensuring security and data integrity in case one or more network nodes are unavailable. Moreover, use of a peer-to-peer based topology enables multiple computing nodes to provide the same client service, enabling any client to access any one of the computing nodes for the desired client service.

More fundamentally, the disclosed embodiment enables client services to be implemented in a manner that eliminates the necessity of servers communicating via inter-server connections that have severely restricted the scalability of conventional servers.

For example, in a traditional (prior art) SMTP environment, client-server protocols assume that an e-mail client is executing on a client device, and that an e-mail server is executing on a server device. Hence, if an e-mail client is disconnected from the server device, the e-mail client is unable to receive messages from the e-mail server (e.g., according to POP3 or IMAP protocols), and the e-mail client is unable to send messages to the e-mail server (e.g., according to SMTP protocol). At most, the e-mail client only can transfer outgoing messages to a send cache (e.g., an outbox) within the client device for awaiting transfer upon reconnection with the e-mail server via an SMTP connection. The source e-mail server (e.g., Server 1) then stores the e-mail messages sent from the originating client (Client 1). The source e-mail server (Server 1) periodically collects all e-mail messages that need to be sent to a destination server (e.g., Server 2), establishes a connection with the destination server using a prescribed mail transfer protocol (similar to SMTP), and transfers the e-mail messages from the source e-mail server (Server 1) to the destination server (Server 2). The destination server (Server 2) then parses the received e-mail messages, and stores the received e-mail messages and appropriate destination folders for destination e-mail clients. Each destination user (e.g., Client 2) then logs into the network, establishes a connection with the destination server (Server 2), for example according to POP3 or IMAP protocols, in order to retrieve the e-mails from the appropriate destination folder. Once the destination server (Server 2) authenticates the destination user (e.g., Client 2), the destination server supplies the e-mails from the destination folder to the client device.

Hence, e-mail communications in conventional client-server e-mail systems inherently will suffer a delay in service if there is a loss of connectivity between any one of three connections, namely the source client to the source server connection, the source server to destination server connection, or the destination server to destination client connection.

As described in detail below, the disclosed embodiment enables the elimination of conventional client-server models by enabling any computing node, including user nodes implemented as laptop computers, to decide whether to participate in providing the distributed client services. Distributed client services may include replication of data among the computing nodes participating in the distributed client services, referred to herein as a resource group, where data ownership (i.e, authority to decide read/write access) is passed between the computing nodes using locality control objects, also referred to as control tokens.

In addition, a given computing node can continue providing the distributed client services, even if the computing node is disconnected from the network, for example in the case of a user traveling with his or her laptop; in this case, a client resource on the user laptop is still able to obtain network-based distributed client services, even though the user laptop is disconnected from the network. Further, the decision whether to participate in providing a distributed client service, based on joining a resource group, rests solely on the computing node, limiting concerns that a computing node may be overwhelmed with processing requests.

The following description will describe in further detail the distributed network architecture that enables individual computing nodes to decide whether to participate in providing a distributed client service, followed by a description of execution of a distributed client service.

Overview of Distributed Network and Selective Joining of Resource Groups

FIG. 1 is a diagram illustrating a network 10 having a directory service 12 and a plurality of computing nodes 14 configured for providing distributed computing services (e.g., distributed client services) based on having joined resource groups 16, according to an embodiment of the present invention. In particular, each distributed computing service provided by the network 10 is implemented based on deployment of multiple resource groups 16 (e.g., S1, S2, S3, and S4), wherein each resource group 16 has its own corresponding set of resource group attributes 22. For example, the resource group "S1" 16 may be established for providing distributed client services related to e-commerce, for example customer e-mail services, web hosting, online transaction management, order processing, and billing operations, etc., where each service is executed based on distributed processing by each of the connected computing nodes 14; the resource group "S2" 16 may be established for providing enterprise based services, for example employee file systems (data storage and retrieval), directory services including the directory service 12, or telephone directory services, accounting management, etc.; similar distributed services may be provided by the other resource groups "S3" and "S4". As described below with respect to FIG. 2A, the resource group attributes 22 for each resource group define both the resource requirements 20 necessary for any computing node to join the resource group, and the attributes 24 of the data replicated and/or executable resources that executed by each of the joined computing nodes 14 in order to provide the distributed services to client nodes 18.

The directory service 12, implemented for example as one of the distributed services provided by one of the resource groups 16, is configured for providing resolutions for identifying available resource groups 16 for clients 18 (i.e., client-based executable application resources that are executing on a given user device) attempting to obtain a corresponding distributed service, and computing nodes 14 attempting to join a resource group to provide distributed processing. The query issued may specify different attributes about the service, for example service type (e.g., e-mail, e-commerce, accounting, database management), data type (e.g., e-mail data for user names starting with A-L and not L-Z), or some other class identification (e.g., corporate, engineering, marketing, legal, etc.).

Additional details related to the directory service 12 can be obtained from commonly-assigned, copending application Ser. No. 11/000,041, filed Dec. 1, 2004, entitled "ARRANGEMENT IN A SERVER FOR PROVIDING DYNAMIC DOMAIN NAME SYSTEM SERVICES FOR EACH RECEIVED REQUEST", the disclosure of which is incorporated in its entirety herein by reference. In summary, a Domain Name System (DNS) server 12 is configured for dynamically selecting, for a client 18 or a computing node 14 requesting information, a selected resolution from available resolutions, the selected resolution identifying at least one destination for the specified service. The dynamic selection of the selected resolution is based on an attribute of the requesting entity (e.g., client 18 or computing node 14) and/or a determined attribute of the network. Hence, the selected resolution directs the requesting entity to a specific destination (e.g., a specific computing node 14 of a given resource group 16) based on prescribed selection criteria, for example service level agreements, the location of the client device, network performance or detected congestion conditions, authentication of the user of the client device, etc. The selected resolution also can be for enforcement of load balancing policies.

Each computing node 14 is configured for selectively joining an available resource group 14, or creating a new resource group 14, based on determining whether the available node capacity for the computing node 14 is sufficient for the resource requirement 20 specified for the corresponding resource group 14. Once a computing node has joined a resource group 16, the joining of the resource 16 is registered with the directory service 12, and clients 18 can be connected to a computing node 14 that provides the corresponding distributed service, based on the directory service 12 responding to a query identifying one of the distributed client services by redirecting the client node 18 to one of the computing nodes 14 that joined the appropriate resource group 16.

Since a computing node 14 is configured for selectively joining a resource group 16 based on the computing node 14 deciding whether it has sufficient available node capacity for the corresponding resource requirement 20, smaller computing nodes 14 (e.g., N1, N2, N5, N6) that have only a limited amount of resources, for example only 160 gigabytes (GB) of storage capacity (or, for example, a limited CPU processing capacity), are able to provide a contribution to available resource groups 16 based on their relative available node capacities. For example, computing nodes N1 and N2 belong only to resource groups S1 and S2, computing node N5 belongs only to resource groups S3 and S4, and computing node N6 belongs only to resource groups S1 and S4.

Computing nodes 14 having substantially larger available node capacities, for example at least an order of magnitude greater (i.e., a difference of at least 10 times) (e.g., N4 having 1600 GB (1.6 TB) storage capacity, N3 having 2.5 Terabyte (TB) storage capacity) also can join the same resource groups 16 as the smaller computing nodes, since each computing node (e.g., N1, N2, N3, N4, N6) having joined a given resource group (e.g., S1) is required to provide only the amount of resources specified by the corresponding resource requirement 20 (R1). Hence, different sized computing nodes 14 can join the same resource group 16, even if the computing nodes 14 differ in size by orders of magnitude.

In addition, since each computing node 14 selectively joins a resource group 16 based on whether the corresponding resource requirement 20 is less than the available node capacity, larger nodes (e.g., N3) can join a greater number of resource groups 16, enabling the larger computing node 14 to provide virtualized services to a substantially larger number of resource groups. As illustrated in FIG. 1, the larger computing node "N4" is able to join the resource groups S1, S3, and S4, and the largest illustrated computing node "N3" is able to join all of the illustrated resource groups S1, S2, S3, and S4 due to its substantially large capacity. Consequently, the network 10 may be composed of smaller computing nodes N1, N2, N5, N6 14 (e.g., laptop computers) that may only have sufficient capacity to join one or two resource groups 16, whereas larger computing nodes N3, N4 14 (e.g., fixed data centers) may be able to join hundreds or even thousands of resource groups 16, as needed.

FIG. 2A is a diagram illustrating resource group attributes 22 for a given resource group 16, including the associated resource requirement 20 necessary for a computing node 14 to join the resource group 16, according to an embodiment of the present invention. The resource group attributes 22 for a given resource group 16 include the resource requirements 20 that need to be reserved by each computing node 14 that joins the resource group 16, and distributed computing service attributes 24 that describe in detail the distributed computing service provided by each of the computing nodes 14 having joined the resource group 16. For example, the resource group "S1" may have computing service attributes 24 that specify service attributes 26 related to the type of distributed service being provided (e.g., e-mail application, directory services applications such as directory service 12, e-commerce applications, data processing or database applications, financial transaction applications, etc.). The computing service attributes 24 also may specify data attributes 28 that specify the attributes of the data that is replicated among the computing nodes 14 belonging to the resource group 16. For example, the data attributes 28 may specify features such as data type (e.g., e-mail message, word processing document, spreadsheet, database object, etc.) source of the data (e.g., author, e-mail composer, financial transaction identifier, etc.) time and date of creation, security key identifiers, or any other class attribute that may be used to classify the data.

Hence, each resource group 16 can be defined based on the attributes 26 of the services being provided, as well as the attributes 28 of the data which is replicated among the computing nodes 14. Also apparent from the foregoing is that each of the computing nodes 14 that belong to a given resource group 16 can respond to a given service attribute 26 that specifies that all data is to be replicated among the computing nodes of the resource group 16, and that each computing node 14 of the resource group 16 has authority to modify the data or create new data, and a requirement to update the other computing nodes 14 of any modification or creation to ensure data is synchronized.

An exemplary method of replicating data among the computing nodes 14 is disclosed in commonly-assigned, copending application Ser. No. 10/859,209, filed Jun. 3, 2004, entitled "ARRANGEMENT IN A NETWORK NODE FOR SECURE STORAGE AND RETRIEVAL OF ENCODED DATA DISTRIBUTED AMONG MULTIPLE NETWORK NODES", the disclosure of which is incorporated in its entirety herein by reference. In summary, data is stored using among computing nodes 14 based on encoding of the data into multiple distinct encoded data units according to a prescribed encoding operation (e.g., Reed Solomon-based N of M encoding). The secure encoding operation generates a first prescribed number (e.g., M=7) of encoded data units, whereas merely a second prescribed number (e.g., N=4) of the encoded data units are necessary for recovery of the original data, the second prescribed number being less than the first prescribed number. The encoded data units are distributed among the computing nodes 14 of the resource group 16, where any one network node can receive less than the second prescribed number if security is needed. A requesting node 14 recovers the original data by requesting the second prescribed number of encoded data units from among the computing nodes 14 having stored the respective encoded data units.

In addition, only the computing nodes 14 that belong to the resource group 16 have authority to modify the associated data, such that non-members cannot modify the data of the resource group. Ownership of authority to modify data is described in commonly-assigned, copending application Ser. No. 10/859,208, filed Jun. 3, 2004, entitled "ARRANGEMENT IN A NETWORK FOR PASSING CONTROL OF DISTRIBUTED DATA BETWEEN NETWORK NODES FOR OPTIMIZED CLIENT ACCESS BASED ON LOCALITY", the disclosure of which is incorporated in its entirety herein by reference.

FIG. 2B is a diagram illustrating a resource table 30 maintained by each computing node 14 in order to track reserved (i.e., allocated) resources, and available node capacity, according to an embodiment of the present invention. In particular, each computing node 14 determines for itself the available node capacity 32, which may be measured for example in terms of storage capacity 34, device bandwidth 36, transaction capacity 38, CPU load 40, etc. The resource table 30 also includes reserve entries 34 that specify the amount of resources that are reserved for respective resource groups to which the computing node is a member (e.g., S1, S2), plus resources reserved for system use by the computing node 14, described below.

Hence, each computing node 14 is able to determine whether it wants to join any given resource group 16 based on comparing the resource group attributes 24 with internal computing node attributes (not shown) that specify preferences for the types of distributed services the computing node 14 should provide. For example, a computing node 14 may include internal computing node preferences (not shown) to indicate the computing node 14 should avoid database management services or financial transaction services, but should join any distributed services associated with a prescribed class of service, for example e-mail server applications, Web hosting applications, Voice over IP applications, etc. In addition, the computing node 14, upon determining that it wishes to join a given resource group, can compare the resource requirement 20 of that resource group 16 with the available node capacity 32 in order to determine whether the computing node 14 has sufficient available resources to join that resource group 16.

Figure 3:
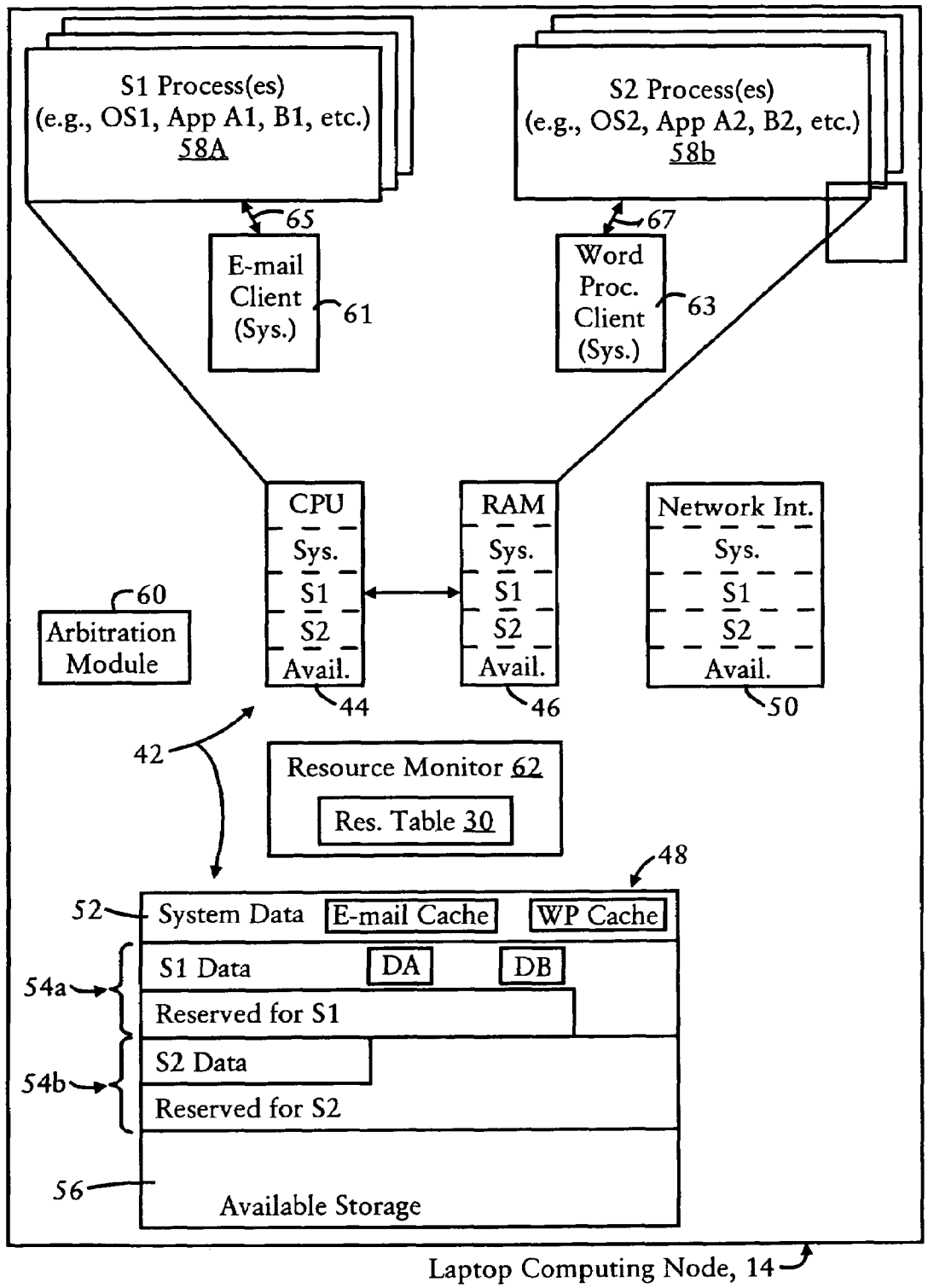
FIG. 3 is a diagram illustrating one of the computing nodes, according to an embodiment of the present invention.

FIG. 3 is a diagram illustrating in detail one of the computing nodes 14 of FIG. 1, according to an embodiment of the present invention. Each computing node 14 includes computing node resources 42 including a processor unit 44, processor memory 46, data storage 48, and a network interface 50. As illustrated in FIG. 3, the data storage 48 includes a reserved portion 52 for storage of system data, reserved portions 54a and 54b for storage of data associated with respective joined resource groups "S1" and "S2", and an available storage portion 56 that is free space that is available for use. As illustrated in FIG. 3, the execution of software by the processor 44 using processor memory 46 may result in instantiation and execution of executable processes 58a and 58b for the respective resource groups "S1" and "S2", where each of the processes 58a and 58b may include their own distinct operating systems, applications, etc.

As illustrated in FIG. 3, the CPU 44, the processor memory 46, and a network interface 50 each have portions of their respective resources allocated for system use, the joined resource groups "S1" and "S2" and available capacity that is available for use.

The computing node 14 also includes a resource monitor 62 configured for continually monitoring the resource utilization in each of the computing node resources 44, 46, 48, and 50, and updating the resource table 30 to indicate the amount of computing node resources that are consumed by each of the joined resource groups 16 relative to the reserved capacity as specified in the resource table 30. The resource monitor 62 also is configured for determining the available node capacity 32 based on comparing the total system capacity minus the reserved capacity 34 that has already been allocated.

The computing node 14 also includes a resource group arbitration module 60 configured for reading the resource table 30 in order to identify the available node capacity 32 determined by the resource monitor 62. The resource group arbitration module 60 is configured for selectively creating a new resource group 16, as needed for example due to internal attributes including administrator settings, etc. The resource group arbitration module 60 also is configured for identifying available resource groups 16, for example by accessing the directory service 12, and selectively joining resource groups 16 based on the associated group attributes 24, and also based on whether the resource requirement 20 of the available resource group 16 is less than the available node capacity 32. Based on the available node capacity 32 being sufficient for the resource requirement 20, the arbitration module 60 can allocated reserve capacity 34 and join the resource group 16, if desired. If after joining the resource group 16 and allocating the corresponding reserve capacity 34 the arbitration module 60 identifies that available node capacity is still present, the arbitration module 60 can continue to selectively join additional resource groups 16 based on the available node capacity 32 being sufficient for the corresponding resource requirement 20.

As illustrated in FIG. 3, the computing node 14, if implemented as a user device (e.g., a laptop computer), also may include executable client application resources, for example an e-mail client 61 and a word-processing client 63. The e-mail client is configured for accessing a prescribed e-mail service: the operating system underlying the e-mail client 61 establishes a connection 65 with the appropriate e-mail service, in this case the application processes 58a providing the distributed e-mail service within the resource group "S1" 16.

Similarly, the operating system underlying the word processing client 63 establishes a connection 67 with the appropriate file service, in this case the application processes 58b providing the distributed file service within the resource group "S2" 16. Additional details related to providing a distributed file service is described in commonly-assigned, copending application Ser. No. 11/051,333, filed Feb. 7, 2005, entitled "ARRANGEMENT FOR A DISTRIBUTED FILE SYSTEM HAVING DATA OBJECTS MAPPED INDEPENDENT OF ANY DATA OBJECT ATTRIBUTE", the disclosure of which is incorporated in its entirety herein by reference. In summary, each data file of a distributed file system is identified by a corresponding globally-unique object identifier that is independent of any attribute of the data file. The distributed file system is established for each resource group 16, such that each resource group 16 has its own distributed file system. A node 14 in the distributed file system (i.e., a node belonging to the corresponding resource group 16) has a file system that includes a plurality of directory entries, where each directory entry has a file name field, an attributes field, and an object identifier field configured for specifying a globally-unique object identifier. The globally-unique object identifier is universally reachable by any computing node 14 of the distributed file system for that resource group 16 and uniquely identifies the data file, enabling the data file to be universally identifiable by any node 14 in the resource group 16 based on the corresponding object identifier. The data file can be stored independently of a device file system based on providing a resolution between the data file name and its object identifier, followed by a resolution between the object identifier and a selected location for the data file.

Distributed Client Services

Figure 4:
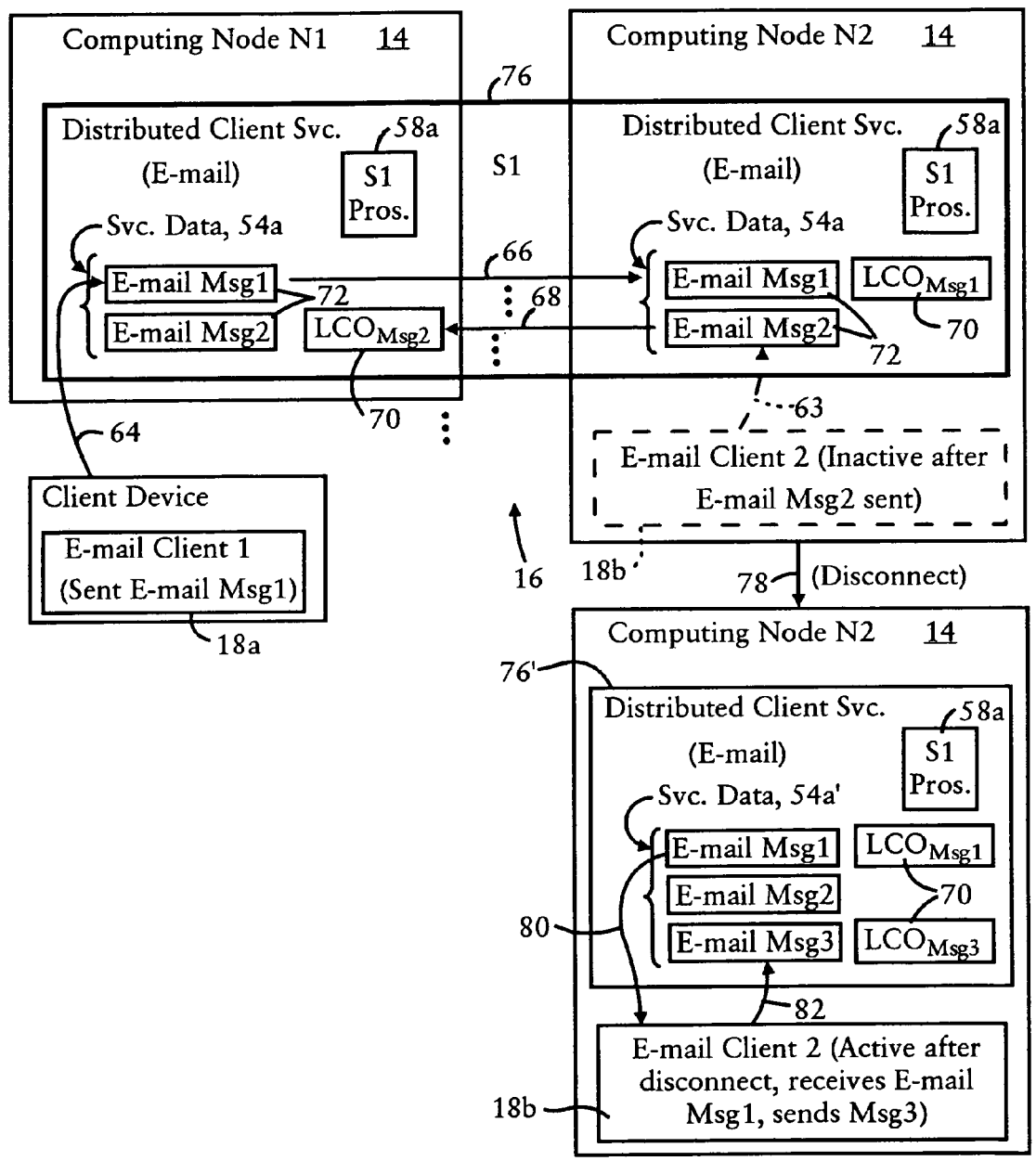
FIG. 4 is a diagram illustrating distributed computing services provided by computing nodes of a resource group, including by one of the computing nodes following a disconnect from the resource group.

FIG. 4 is a diagram illustrating distributed computing services provided by computing nodes of a resource group, including by one of the computing nodes following a disconnect from the resource group. As illustrated in FIG. 4, the computing nodes N1 and N2 provide the distributed client service 76, for example a distributed e-mail service, based on concurrent execution of the required application processes 58a in accordance with the service attributes 26 of the resource group 16, and storage and replication of the service data 54a in accordance with the data attributes 28. In other words, each computing node 14 independently executes its corresponding application process 58a in accordance with the service attributes 26, including manipulating the locally-stored service dated 54a accordingly. If the application process 58a detects that the another computing node is reachable, then the application processes 58a interact for synchronization of the service data 54a, and any necessary arbitration, for example identifying which computing node should possess the locality control object 70 for a given data object 72.

As illustrated in FIG. 4, the distributed client service 76 executed by the executable process 58a in the computing node N1 is configured for receiving an e-mail message "E-mail Msg1" 72 from the e-mail client 18a at event 64. The application process 58a determines from the data attributes 28 that the message 72 has the appropriate attributes, and replicates the e-mail message "E-mail Msg1" 72 to all reachable computing nodes at event 66. The application process 58a in the computing node N1 also creates for the e-mail message "E-mail Msg1" 72 a locality control object ($LCO_{Msg1}$) 70, and selectively passes the locality control object ($LCO_{Msg1}$) at event 66 to the computing node most appropriate to retain ownership of the corresponding e-mail message, namely the computing node "N2" 14 that is most likely to provide distributed e-mail services for the destination client (e.g., Client 2) 18b.

Assuming the e-mail client 18b had transmitted an e-mail message "E-mail Msg2" 72 at event 63 prior to the e-mail client 18a having sent the e-mail message "E-mail Msg1" 72 at event 64, the application process 58a of the computing node N2 creates the corresponding locality control object ($LCO_{Msg2}$) 70, and replicates the data at event 68 to all reachable computing nodes (e.g., N1), and selectively passes the corresponding locality control object ($LCO_{Msg2}$) 70 at event 68 to the computing node most appropriate to retain ownership of the e-mail message, namely the computing node N1 providing service for the destination client 18a.

Also note that the computing node N2 14 can continue to provide distributed client services 76' even though the computing node was disconnected 78 from the rest of the resource group 16. In particular, assume that the e-mail client 18bwas terminated prior to the e-mail client 18b receiving the e-mail message "E-mail Msg1" from the distributed client service 76. Hence, the distributed client service 76 continues to store the e-mail message for the terminated e-mail client 18b.

Assume now that the computing node "N2" is disconnected from the resource group 16 at event 78, for example due to the user of the computing node "N2" 14 moving the computing node from the network 10 to another location (e.g., business travel). In this case, the application process 58a of the distributed client services 76' continues to provide e-mail services to the e-mail client 18b once the e-mail client 18b restarts execution following the disconnection at event 78. Hence, the application process 58a implements the distributed client service 76' by supplying e-mail messages ("E-mail Msg1") to the e-mail client 18b(event 80), and "sending" e-mail messages having been sent from the e-mail client 18b (event 82). The application process 58a in the distributed client service 76' can choose whether to offer the e-mail client 18b based on whether the computing node N2 is in possession of the corresponding locality control object 70, and based on prescribed service attributes 26; for example, the distributed client service 76' would provide read/write authorization for the received e-mail message "E-mail Msg1" based on determining that the e-mail client 18b is the rightful owner of the message, but provided read only authorization for the e-mail message "E-mail Msg3" that was already transmitted by the e-mail client 18b at event 82.

Hence, the computing node can resynchronize its service data 54a' with the other computing nodes 14 of the resource group 16 upon reconnection with at least one of the computing nodes 14 belonging to that resource group 16.

Hence, the distributed client service 76 can be provided by the computing nodes 14, even without all of the computing nodes 14 of a given resource group being in communication at the same time; rather, as described above, the distributed computing service 76 and 76' is provided based on each computing node 14 participating in the corresponding resource group 16 according to the resource group attributes 22. Data is resynchronized as each computing node 14 detects reachability of another computing node14a with in the same resource group 16, and ownership of the data is determined based on identifying the computing node 14 that possesses the corresponding locality control object 70.

Figure 5:
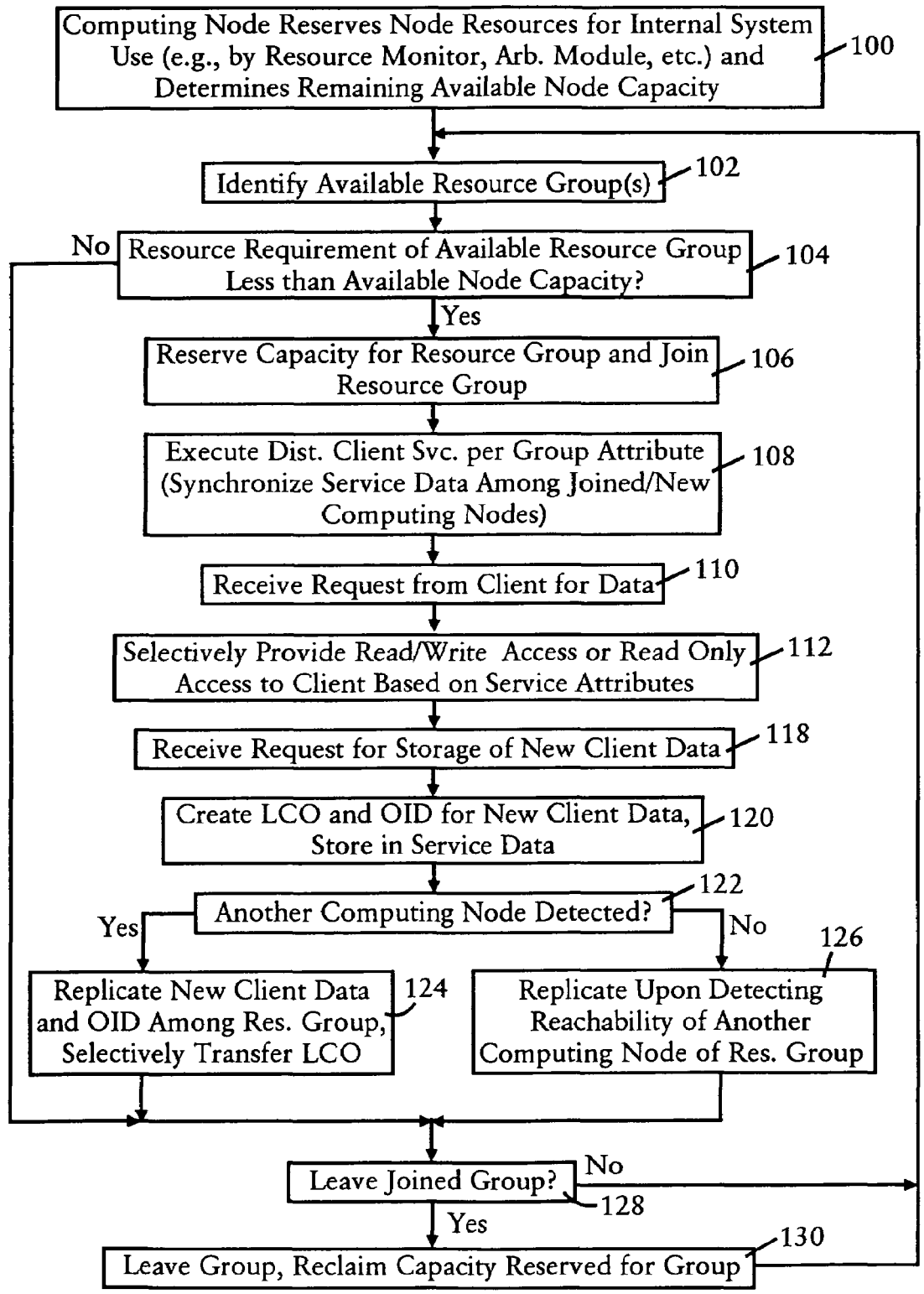
FIG. 5 is a diagram illustrating the method of joining resource groups for execution of distributed client services by computing nodes, according to an embodiment of the present invention.

FIG. 5 is a diagram illustrating the method of providing distributed client services, according to an embodiment of the present invention. The steps described herein can be implemented in each network node as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 100, where each computing node 14 reserves node resources 52 for internal system use, including for example for use by the resource monitor 62, any client application 61 or 63, and the arbitration module 60. Alternately, the resource monitor 62 and the arbitration module 60 may be implemented as discrete components that are distinct from the processor 44 and the memory 46. In addition, the resource monitor 62 determines the available node capacity and stores the parameters in its entry table 32. It should be noted here in the resource monitor 62 continually monitors all consumption of resources in order to determine if consumption of resources by an assigned consumer (e.g., a resource group 16) reaches a prescribed percentage threshold (e.g., 95%) relative to the amount of reserved capacity 34.

Assuming no new resource groups need to be created by the computing node 14, the arbitration module 60 identifies in step 102 any available resource groups (e.g., "S1") 16, for example based on issuing a query to the directory service 12 that requests identification of either all available resource groups 16, or selected resource groups having selected service attributes 24 (e.g., e-mail application service) or selected data attributes 28. In response to receiving from the directory service 12 at least one resource requirement 24 for a corresponding resource group 16, the resource group arbitration module 60 determines in step 104 whether the resource requirement 20 for joining the available resource group 16 is less than the available node capacity 32. If the resource requirement 20 is not less than the available node capacity 32 (i.e., the resource requirement 20 exceeds the available node capacity 32), the resource group arbitration module 60 decides to not join the resource group, and determines whether to leave any joined group to reclaim resources, described below.

If in step 104 the resource group arbitration module 60 determines that the resource requirement 20 does not exceed the available node capacity 32, the resource group arbitration module 60 reserves capacity in step 106 from the available node capacity 32, creates an additional entry 34 for the reserved capacity, and joins the resource group 16.

The resource group arbitration module 60 finishes joining the resource group 16 in step 108 by notifying the other computing nodes 14 already belonging the resource group 16 of its having joined the resource group 16. The other computing nodes already belonging to the resource group 16 can then replicate their data associated with the resource group 16 to the newly joined computing node 16 for storage in the associated reserved data storage 54, enabling the computing resources 42 to execute in step 108 the distributed computing services, for example by instantiating the relevant software processes (e.g., 58*a*).

It should be noted that each of the resource groups 16 are dynamic in that their characteristics (identified by the stored attributes 22) may change, in terms of resource requirements 20 due to additional loading on the distributed services (e.g., due to more user nodes 18 requesting service from the resource group 16) or an accumulation of stored data, or in terms of changes in the computing service attributes 24, for example changes in service attributes 26 indicating that a new service is to be provided that differs from existing services, or that a similar services to be provided using different resource types. Consequently, each of the resource group arbitration modules 60 are configured for adapting the resource groups 16 to changes in the computing service attributes 24, or the resource requirements 20, optimizing performance of the resource group 16 and enabling the capacity of the network 10 to increase based on creating new resource groups 16. Such changes, including splitting (i.e., dividing) and merging resource groups, are described in the above-incorporated parent application entitled "DISTRIBUTED COMPUTING BASED ON MULTIPLE NODES WITH DETERMINED CAPACITY SELECTIVELY JOINING RESOURCE GROUPS HAVING RESOURCE REQUIREMENTS" (application Ser. No. 11/053,954, filed Feb. 10, 2005).

Examples of the distributed client services will now be provided. Assume in step 110 that the distributed client service 76 receives in step 110 a request from the client 18 for data. As described above, an exemplary client is the e-mail client 61 (e.g., 18*a* or 18*b*), or the word processing client 63. The application process 58 on the corresponding computing node 14 selectively provides in step 112 the requested data by providing either read/write access to the requested data file (e.g., in the case of a word processing client 63 having authorized access to data for which the user has ownership), or read-only access (e.g., in the case of an e-mail client attempting to read an e-mail message already having been sent successfully to the distributed client services 76), based on the service attributes 26 indicating whether the client is authorized to modify/write the data, or is restricted to read-only data.

In the case where the distributed client services 76 receives in step 118 a request for storage of new client data (e.g., a new e-mail message to be transmitted) the application process 58 in the computing node 14 having received the client request stores the new client data as service data 54*a* within the distributed file system of the distributed client service 76 based on creating a locality control object 70 for the new client data, and a unique object identifier (OID) that uniquely identifies the new client data within the distributed file system maintained by the distributed client service 76 in the resource group 16. Additional details related to creation of a unique object identifier for storage of data in a distributed file system is described in the above-incorporated application Ser. No. 11/051,333, entitled "ARRANGEMENT FOR A DISTRIBUTED FILE SYSTEM HAVING DATA OBJECTS MAPPED INDEPENDENT OF ANY DATA OBJECT ATTRIBUTE".

If in step 122 another computing node 14 is detected, the application process 58 replicates in step 124 the new client data and the corresponding OID among the computing nodes 14 connected to the resource group 16, and selectively transfers the locality control object 70 to the most appropriate destination (see, e.g., events 66 and 68 of FIG. 4). If no other computing node 14 is detected, the application process 58 continues operations, and replicates in step 126 the data upon detecting reachability of another computing node 14 in the resource group.

Hence, computing nodes 14 can provide distributed client services 76 based on coordinating transactions between application processes 58 that are executed independently on each computing node 14 according to prescribed service attributes 26, and based on managing and replicating data according to prescribed data attributes 28. In addition, data replication and transfer of locality control objects can be passed to different computing nodes 14 as they are reachable; hence, computing nodes need not be simultaneously connected, but rather can be connected and disconnected, each time synchronizing data and passing control using locality control objects.

As apparent from the foregoing, each of the application processes 58 of the resource group 16 have authority to perform read/write operations on the distributed data, based either on possession of the corresponding locality control object 70 or arbitration between the application processes 58 of the resource group 16 for transfer of the locality control object, enabling any one of the application processes 58 executed by any computing node 14 to provide the same read/write access. In addition, if the computing node is disconnected from the network and requires the locality control object, instances may arise where the computing node may be able to create a new locality control object. Hence, the application process 58 executed locally on the same computing node 14 as the executable client 18 will be able to provide read/write access to distributed data, as needed. Once the computing node rejoins the network, the changes can be replicated to other members of the computing group. In addition, computing groups may be split or merged as necessary, as described in detail in the above-incorporated application (application Ser. No. 11/053,954, filed Feb. 10, 2005), enabling the formation of personalized computing groups for personal services that can be merged with general computing groups once other users need access to the personal services.

If in step 128 the resource group arbitration module 60 determines to leave a joined group 16, for example due to reduced activity in the resource group 16, or based on determining that the available node capacity has diminished below a prescribed threshold, the resource group arbitration module 60 leaves the resource group 16 in step 130 by notifying the other members of the resource group, and reclaiming the capacity 34 that had been reserved for the resource group 16, and returning the reclaimed capacity back to the available node capacity 32. Note that even though a computing node 14 implemented as a laptop could decide to leave a joined group in anticipation of being disconnected from the network 10, the disclosed embodiment does not necessarily require that the computing node 14 leaves the joined group 16 merely because it will be disconnected from the other computing nodes 14; rather, the computing node 14 still could continue to provide distributed services while disconnected from the other computing nodes 14 of the resource group, and simply resynchronize data and state information upon reconnection with the other computing nodes 14.

According to the disclosed embodiment, distributed client services in a network are provided by computing nodes having substantially different node capacities, based on each computing node selectively joining a resource group having a resource requirement that is less than the available node capacity. Each computing node that joins a resource group, however, shares the same amount resources as specified by the resource requirement for the resource group, regardless of the overall capacity of the computing node. Hence, substantially larger computing nodes can join a larger number of resource groups, providing distributed service virtualization without concerns of loss of data if the larger computing node becomes unavailable. In addition, substantially larger computing nodes can be added to the network 10 without any adverse effect on existing computing nodes 14 already in the network. Moreover, the replication of service data between the computing nodes of a resource group 16 according to prescribed data attributes 28, plus the coordinated transactions between application processes according to the prescribed service attributes 26 in each of the computing nodes 14 that belong to the resource group 16, enable the computing nodes 14 to provide a distributed client service that is still available even if one of the computing nodes disconnects from the network.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a computing node, comprising:
   determining an available node capacity for the computing node relative to any resource groups having been joined by the computing node, each resource group having a corresponding resource group attribute specifying a resource requirement for providing a corresponding distributed client service within a network, a service attribute that defines parameters for execution of the corresponding distributed client service, and a data attribute that defines service data to be used in providing the corresponding distributed client service for a client;
   selectively joining at least one of the resource groups based on the corresponding resource requirement being less than the available node capacity; and
   executing the distributed client service for the corresponding at least one resource group having been joined by the computing node, according to the corresponding resource group attribute, including replicating the corresponding service data among any other computing nodes belonging to the corresponding at least one resource group according to the corresponding service attribute and the corresponding data attribute.

2. The method of claim 1, wherein the executing includes receiving replicated service data from one of the other computing nodes belonging to corresponding at least one resource group, the method further comprising:
   disconnecting from the network; and
   executing the client on the computing node independent of the distributed client service and while the computing node is disconnected from the network, including sending a request by the client to the distributed client service for client data;
   the executing of the distributed client service including supplying the client data, from among the replicated service data, while the computing node is disconnected from the network.

3. The method of claim 2, wherein:
   the executing of the client further includes sending a second request to the distributed client service for transfer of second client data from the client to a destination;
   the executing of the distributed client service further including identifying the second client data received from the client for replication in the corresponding resource group based on the service attribute and the data attribute, and replicating the second client data among the resource group in response to detecting at least one of the other computing nodes belonging to the corresponding resource group is reachable following said disconnecting.

4. The method of claim 3, wherein the identifying including creating for the second client data a locality control object that defines ownership of the second client data, the distributed client service selectively providing the client one of read-only access or read/write access of the second client data following receipt of the second request by the distributed client service, based on the service attribute and the data attribute.

5. The method of claim 4, wherein:
   the distributed client service provides read-only access of the second client data based on the data attribute specifying the second client data is a message having been sent by the client for reception by a destination;
   the distributed client service provides read/write access of the second client data based on the data attribute specifying the second client data is a data file that the client is authorized to modify, the service attribute specifying the distributed client service providing file system storage and retrieval for the client.

6. The method of claim 2, wherein the supplying of the client data while the computing node is disconnected from the network includes selectively providing read/write access to the client based on the service attribute and the data attribute.

7. A method in a network, the method comprising:
   providing resource groups, each resource group having a corresponding resource group attribute specifying a resource requirement for providing a corresponding distributed client service within the network, a service attribute that defines parameters for execution of the corresponding distributed client service, and a data attribute that defines service data to be used in providing the corresponding distributed client service for a client;

in each computing node of the network:
(1) determining a corresponding available node capacity relative to any of said resource groups having been joined by the computing node,
(2) selectively joining at least one of the resource groups based on the corresponding resource requirement being less than the available node capacity, and
(3) executing the distributed client service for the corresponding at least one resource group having been joined by the computing node, according to the corresponding resource group attribute; and connecting a client, of the distributed client service, to the distributed client service via one of the computing nodes having joined the corresponding resource group;

wherein each of the computing nodes having joined said at least one resource group perform the executing of the distributed client service based on replicating the corresponding service data among each of the other computing nodes belonging to the corresponding at least one resource group, according to the corresponding service attribute and the corresponding data attribute.

8. The method of claim 7, wherein the executing includes:
receiving from the client a request by the one computing node for transfer of client data from the client;
identifying the client data received from the client for replication in the corresponding resource group based on the service attribute and the data attribute; and
replicating the client data among the resource group in response to detecting at least one of the other computing nodes belonging to the corresponding resource group is reachable.

9. The method of claim 8, wherein the identifying includes creating for the client data a locality control object that defines ownership of the client data, the distributed client service selectively providing the client one of read-only access or read/write access of the client data following receipt of the request by the distributed client service, based on the service attribute and the data attribute.

10. The method of claim 9, wherein:
the distributed client service provides read/write access of the client data based on the data attribute specifying the client data is a data file that the client is authorized to modify, the service attribute specifying the distributed client service providing file system storage and retrieval for the client;
the distributed client service provides read-only access of the client data based on the data attribute specifying the client data is a message having been sent by the client for reception by a destination client, the distributed client service providing read/write access of the client data based on passing the corresponding locality control object to one of the computing nodes belonging to the corresponding resource group deemed most appropriate to provide the distributed client service for the destination client.

11. The method of claim 10, further comprising:
receiving from the destination client, by the one computing node deemed most appropriate to provide the distributed client service, a request for the distributed client service;
supplying, by the one computing node deemed most appropriate to provide the distributed client service, the client data to the destination client, enabling the destination client to obtain the read/write access of the client data.

12. The method of claim 7, further comprising:
detecting, by the computing nodes having joined said at least one resource group, a new computing node having joined the resource group; and synchronizing service data based on:
replicating to the new computing node the service data based on one of the computing nodes having a locality control object for the service data, the locality control object defining ownership of the service data for authority of read/write access of the service data; and
replicating from the new computing node new service data based on the new computing node having the corresponding locality control object for the new service data.

13. A computing node comprising:
a resource monitor configured for determining an available node capacity for the computing node relative to any resource groups having been joined by the computing node, each resource group having a corresponding resource group attribute specifying a resource requirement for providing a corresponding distributed client service within a network, a service attribute that defines parameters for execution of the corresponding distributed client service, and a data attribute that defines service data to be used in providing the corresponding distributed client service for a client;
a resource group arbitration module configured for selectively joining at least one of the resource groups based on the corresponding resource requirement being less than the available node capacity; and
computing node resources configured for executing the distributed client service for the corresponding at least one resource group having been joined by the computing node, according to the corresponding resource group attribute, including replicating the corresponding service data among any other computing nodes belonging to the corresponding at least one resource group according to the corresponding service attribute and the corresponding data attribute.

14. The computing node of claim 13, wherein the computing node resources are configured for receiving replicated service data from one of the other computing nodes belonging to corresponding at least one resource group, the computing node resources further configured for:
detecting the computing node is disconnected from the network; and
executing the client independent of the distributed client service and while the computing node is disconnected from the network, including sending a request by the client to the distributed client service for client data;
the executing of the distributed client service including supplying the client data, from among the replicated service data, while the computing node is disconnected from the network.

15. The computing node of claim 14, wherein:
the computing node resources further are configured for executing the client by sending a second request to the distributed client service for transfer of second client data from the client to a destination;
the computing node resources further are configured for executing the distributed client service by identifying the second client data received from the client for replication in the corresponding resource group based on the service attribute and the data attribute, and replicating the second client data among the resource group in response to detecting at least one of the other computing nodes belonging to the corresponding resource group is reachable following said disconnecting.

16. The computing node of claim 15, wherein the computing node resources further are configured for creating for the second client data a locality control object that defines ownership of the second client data, the distributed client service selectively providing the client one of read-only access or read/write access of the second client data following receipt of the second request by the distributed client service, based on the service attribute and the data attribute.

17. The computing node of claim 16, wherein:
the distributed client service provides read-only access of the second client data based on the data attribute specifying the second client data is a message having been sent by the client for reception by a destination;
the distributed client service provides read/write access of the second client data based on the data attribute specifying the second client data is a data file that the client is authorized to modify, the service attribute specifying the distributed client service providing file system storage and retrieval for the client.

18. The computing node of claim 14, wherein the supplying of the client data while the computing node is disconnected from the network includes selectively providing read/write access to the client based on the service attribute and the data attribute.

19. A network comprising:
a plurality of computing nodes configured for selectively joining resource groups, each resource group having a corresponding resource group attribute specifying a resource requirement for providing a corresponding distributed client service within a network, a service attribute that defines parameters for execution of the corresponding distributed client service, and a data attribute that defines service data to be used in providing the corresponding distributed client service for a client;
each computing node configured for:
(1) determining a corresponding available node capacity relative to any of said resource groups having been joined by the computing node,
(2) selectively joining at least one of the resource groups based on the corresponding resource requirement of the second resource group being less than the available node capacity, and
(3) executing the distributed client service for the corresponding at least one resource group having been joined by the computing node, according to the respective resource group attribute;
wherein one of the computing nodes that executes distributed client service, in response to receiving a request from a client of the distributed client service, performs the distributed client service for the client, each of the computing nodes having joined said at least one resource group perform the executing of the distributed client service based on replicating the corresponding service data among each of the other computing nodes belonging to the corresponding at least one resource group, according to the corresponding service attribute and the corresponding data attribute.

20. The network of claim 19, wherein the one computing node is configured for:
receiving from the client a request for transfer of client data from the client,
identifying the client data received from the client for replication in the corresponding resource group based on the service attribute and the data attribute; and
replicating the client data among the resource group in response to detecting at least one of the other computing nodes belonging to the corresponding resource group is reachable.

21. The network of claim 20, the one computing node is configured for identifying the client data based on creating for the client data a locality control object that defines ownership of the client data, the distributed client service selectively providing the client one of read-only access or read/write access of the client data following receipt of the request by the distributed client service, based on the service attribute and the data attribute.

22. The network of claim 21, wherein:
the distributed client service provides read/write access of the client data based on the data attribute specifying the client data is a data file that the client is authorized to modify, the service attribute specifying the distributed client service providing file system storage and retrieval for the client;
the distributed client service provides read-only access of the client data based on the data attribute specifying the client data is a message having been sent by the client for reception by a destination client, the distributed client service providing read/write access of the client data based on passing the corresponding locality control object to one of the computing nodes belonging to the corresponding resource group deemed most appropriate to provide the distributed client service for the destination client.

23. The network of claim 22, wherein the one computing node deemed most appropriate to provide the distributed client service is configured for:
receiving from the destination client a request for the distributed client service;
supplying the client data and the corresponding locality object to the destination client, enabling the destination client to obtain the read/write access of the client data.

24. The network of claim 19, wherein the computing nodes having joined said at least one resource group are configured for:
detecting a new computing node having joined the resource group; and
synchronizing service data based on:
(1) replicating to the new computing node the service data based on one of the computing nodes having a locality control object for the service data, the locality control object defining ownership of the service data for authority of read/write access of the service data; and
(2) replicating from the new computing node new service data based on the new computing node having the corresponding locality control object for the new service data.

25. A computing node comprising:
means for determining an available node capacity for the computing node relative to any resource groups having been joined by the computing node, each resource group having a corresponding resource group attribute specifying a resource requirement for providing a corresponding distributed client service within a network, a service attribute that defines parameters for execution of the corresponding distributed client service, and a data attribute that defines service data to be used in providing the corresponding distributed client service for a client;
means for selectively joining at least one of the resource groups based on the corresponding resource requirement being less than the available node capacity; and
means for executing the distributed client service for the corresponding at least one resource group having been joined by the computing node, according to the corresponding resource group attribute, including replicating the corresponding service data among any other computing nodes belonging to the corresponding at least one resource group according to the corresponding service attribute and the corresponding data attribute.

26. The computing node of claim 25, wherein the means for executing is configured for:
- receiving replicated service data from one of the other computing nodes belonging to corresponding at least one resource group;
- determining that the computing node is disconnected from the network;
- executing the client on the computing node independent of the distributed client service and while the computing node is disconnected from the network, the including sending a request by the client to the distributed client service for client data;
- executing the distributed client service based on supplying the client data, from among the replicated service data, while the computing node is disconnected from the network.

27. The computing node of claim 26, wherein the means for executing is configured for:
- executing the client based on sending a second request to the distributed client service for transfer of second client data from the client to a destination;
- executing the distributed client service based on identifying the second client data received from the client for replication in the corresponding resource group based on the service attribute and the data attribute, and replicating the second client data among the resource group in response to detecting at least one of the other computing nodes belonging to the corresponding resource group is reachable following said disconnecting.

28. The computing node of claim 27, wherein the means for executing is configured for creating for the second client data a locality control object that defines ownership of the second client data, the distributed client service selectively providing the client one of read-only access or read/write access of the second client data following receipt of the second request by the distributed client service, based on the service attribute and the data attribute.

29. The computing node of claim 28, wherein:
- the distributed client service provides read-only access of the second client data based on the data attribute specifying the second client data is a message having been sent by the client for reception by a destination;
- the distributed client service provides read/write access of the second client data based on the data attribute specifying the second client data is a data file that the client is authorized to modify, the service attribute specifying the distributed client service providing file system storage and retrieval for the client.

30. The computing node of claim 26, wherein the means for executing is configured for supplying the client data while the computing node is disconnected from the network based on selectively providing read/write access to the client based on the service attribute and the data attribute.

* * * * *